Jan. 15, 1924.
G. H. EDDY
PUBLICATION ROUTING
Filed July 6, 1920
1,480,605
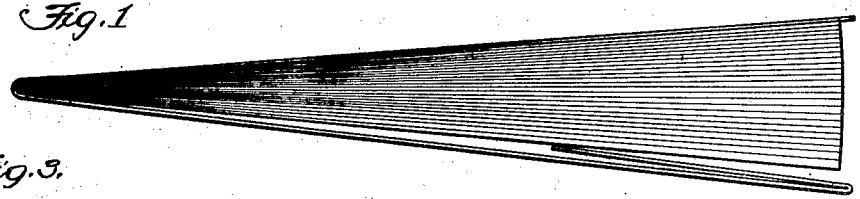
Fig. 1
Fig. 3.
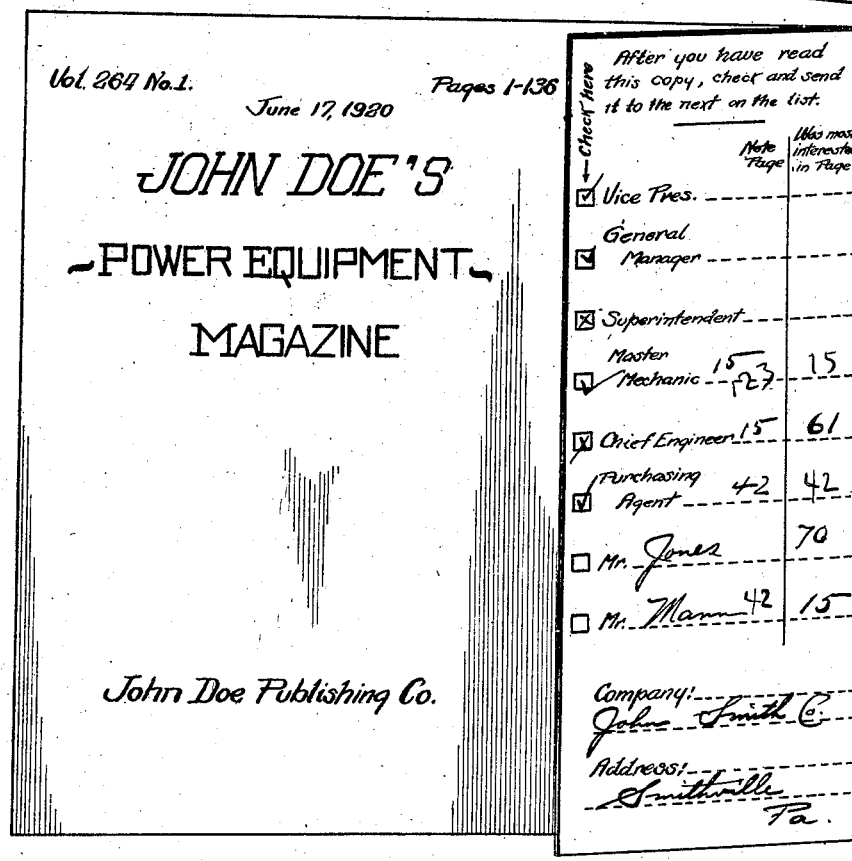
Fig. 2.
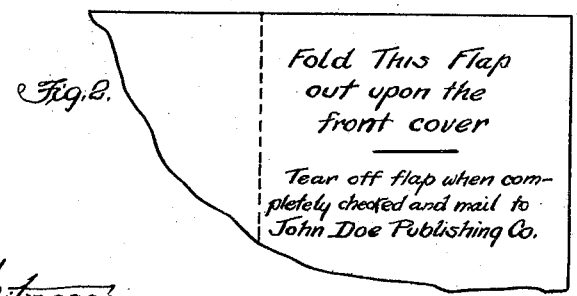
Witness:
Inventor:
Glenn H. Eddy
by Albert Scheible
Attorney Patented Jan. 15, 1924.

1,480,605

UNITED STATES PATENT OFFICE.

GLENN H. EDDY, OF CHICAGO, ILLINOIS.

PUBLICATION ROUTING.

Application filed July 6, 1920. Serial No. 394,235.

*To all whom it may concern:*

Be it known that I, GLENN H. EDDY, a citizen of the United States, residing at Chicago, Illinois, have invented certain new and useful Improvements in a Publication Routing; and I do hereby declare the following to be a full, clear, and exact description of the invention, such as will enable others skilled in the art to which it appertains to make and use the same.

My invention relates to publications, and in its general aspects aims to provide simple and effective means for insuring the routing of single copies of the publication to a group of associated individuals, for calling the attention of different individuals to selected portions of the publication, for attesting the attention of different individuals to the publication, and for securing data as to the class of readers actually reached by the publication and as to the portion of the contents in which different classes of readers were interested.

While my invention may apply with equal facility to a wide variety of publications, it is particularly adapted for periodicals which depend for at least a part of their earnings upon the effectiveness of their advertising columns. To secure this effectiveness for the advertisers, it is important that the periodicals should reach readers who are seriously interested in what is advertised, and in the case of manufacturing plants or other large business establishments it is also important that the advertising should simultaneously reach and influence various officials and employees of the same establishment. Furthermore, it is important that this should be effective with a minimum number of copies, so as to keep down the cost of the publication, and that the influential officials and employees should be reached by by the publication even though their individual names may not be known to the publisher.

Moreover, the subject matter of many advertisements depends for its salability on a preliminary enlightening of the proper parties as to the economy or other features of the desirability of what is advertised, so that the advertisements may depend in effectiveness partly on the extent to which editorials or other articles elucidating related themes are read by the various officers and employees who need to be influenced by the advertisers. It is likewise important both for the advertising value of a publication and for its general educational influence that various men associated in a given establishment should secure hints from one another as to particular items in each issue of the publication which deserve attention, and for this purpose it is highly desirable that the high officials should have simple and effective means both for calling the attention of subordinates to items relating to their respective spheres and for insuring the attention of these subordinates to the items thus marked.

So also, since the value of a periodical as an advertising medium is judged both by the number, the class and the quality of its readers, it is important for the publisher to ascertain the extent to which his publication is read by men holding different positions or having relatively different interests, and to ascertain what topics are of particular interest to the larger number of readers. Heretofore, it has not been possible for the publishers of periodicals to secure such information without making surveys at a high cost, but my invention aims to provide simple and inexpensive means for making such surveys while also meeting the various needs above outlined. Still further objects of my invention may appear from the following specification, and from the accompanying drawings, in which—

Fig. 1 is a top view of an embodiment of my invention in the form of a periodical shown as partly opened and having the hereafter described flap folded inside the front cover or into the position occupied by it when the publication is mailed.

Fig. 2 is a fragmentary elevation of the flap when unfolded and of the cover to which it is attached.

Fig. 3 is an elevation of the front cover of the publication as it appears when the flap is folded outward or into its operative position.

In accomplishing the purposes of my invention after the manner of the appended drawings, I provide the cover of the periodical with an extension which is desirably secured to the free lateral edge of the front cover. This extension desirably is of such a size and shape with respect to the front cover of the publication that it will not conceal any considerable portion of the cover when folded outward over the latter as here disclosed. For this purpose I preferably employ a relatively narrow flap scored at its juncture with the front cover and adapted to be folded inside this cover after the manner of Fig. 1 to prevent a damaging of the flap when the periodical is being mailed and to expose the front cover in its entirely when the periodical is displayed in news stands, in libraries or the like. When unfolded after the manner of Fig. 2, this flap desirably bears on its forward surface a legend instructing the initial recipient of the copy to fold the flap out upon the front cover and calling attention also to the routing and checking facilities which will be afforded by the flap when the latter is thus folded outward after the manner of Fig. 3.

On the reverse or normally unfolded side of the flap, I provide a series of associated legends here shown as including the titles of various officials of a manufacturing corporation and of other employees holding prominent positions, and I desirably provide suitably indicating space opposite each such title for noting the pages to which the attention of the corresponding party is called and for having each such party indicate the fact that he has seen that copy of the publication. Where information is also desired as to the part of the contents which were of particular interest to the different individuals, I provide opposite each title a suitable indicating space for noting the page number of such items, and I also provide a suitable space for noting the name and address of the company whose officers and employees were thus reached, so that the desired information will be complete when the tab is detached and returned to the publisher.

With cover flaps thus arranged, a single copy of a publication can readily be routed through a plant and can simultaneously accomplish the above recited purposes, both for increasing the educational and advertising value of the publication and for securing the information desired by the publisher. For example, when the illustrated copy of a periodical reaches the addressed factory, the mail clerk turns the flap outwardly, desirably securing it temporarily in that position by means of an ordinary paper clip, and delivers it to the vice president of the company. The latter not only makes his own check mark to indicate that he has seen the copy, but may also note opposite the title of any of the other officials or employee the page number indicating some item to which he would call the attention of the corresponding party. Then the same copy goes to the general manager, and when checked or marked by him, to the superintendent, and so on. Where it is desirable that a given publication should also reach some others whose titles are not printed on the flap, these may be added on lines provided below the printed list of officials as shown in Fig. 3. If information is desired by the publisher as to the items which were of special interest to the various readers, notations of the corresponding pages may be made by the various readers after the manner also shown in Fig. 3, and when all of the listed parties have check-marked the tab to show that they have seen the particular copy, the tab can either be torn off (as in cases where it is to be returned to the publisher) or folded back into its initial position as shown in Fig. 1.

When the tab has thus been marked up as shown in Fig. 3, it will be obvious that this single copy of the publication was seen by eight different parties, that four of these have had their attention called to particular items in this copy and that five have expressed their opinion as to the part of the contents which most deeply interested them. Consequently, the use of my invention after the manner illustrated not only increases the number of readers per copy of the publication, but also greatly increases the influence of its contents, it being obvious that the attention of various individuals may be called with equal facility to reading pages or to advertisements and that the normal curiosity of different individuals may lead them also to look up what has been called to the attention of others. The effects thus secured are therefore cumulative, so that a single copy of a periodical mailed to one establishment may exert a much greater influence than would otherwise be afforded by a half dozen copies sent directly to the same individuals. Moreover, such a separate sending of copies to the proper individuals can usually be secured only when their names are known to the publishers, which is rarely the case to any considerable extent, whereas the method above described insures a reaching of the desired officials and other highly positioned employees and remains effective regardless of changes in the persons holding the different positions.

Generally speaking, my method therefore enables both the publisher and the advertiser to secure far greater returns from a given circulation of a publication than has heretofore been possible, thereby increasing the advertising value of the publication and also enabling the publisher to accomplish the desired results with a much smaller number of copies. This latter factor is all the more important in view of the enormous increase of the cost of paper and other publishing expenses during recent years, as these increases have brought the cost to a point where it is highly desirable that every distributed copy should be perused by a large number of readers; however, while I have illustrated and described my invention as employed in connection with a magazine and as including a lateral flap on the front cover, I do not wish to be limited to these or other details of the construction, arrangement and use thus disclosed, since various additions, omissions or other changes might obviously be made without departing from the spirit of my invention or from the appended claims.

I claim as my invention:

1. Means for routing a single copy of a publication through an organization or institution and for calling the attention of different employees thereof to contents of the said copy, comprising a publication part bearing printed legends designating the titles of various officials or other employees of a typical establishment and also bearing a heading directing the forwarding of the publication from one to another of the holders of said titles, and further having suitably designated spaces adjacent to each of the respective titles for check-marking by the persons holding these titles and for noting the page or pages of the publication to which the attention of the other respective persons is called to indicate the part of the publication in which the holders of such titles are most interested in.

2. In a publication, a cover having a normally infolded flap bearing printed legends designating the titles of various officers or employees of a typical establishment of the class to which the publication appeals, and further bearing a heading directing the forwarding of the publication from one to another of the holders of said titles, whereby the publication is successively to be routed to the said individuals, and also having suitably designated spaces adjacent to the respective titles for receiving notations by or for the holders of such titles to indicate the part of the publication in which the holders of such titles are most interested in.

3. In a publication, a cover having integral therewith a normally infolded flap bearing printed legends designating the titles of various officers or other employees of an establishment and further bearing a heading directing the forwarding of the publication from one to another of the holders of said titles to whom the publication is successively to be routed, the flap being adapted to be folded outward to overlie a part of the cover and to expose the said legends when in this latter position.

4. In a publication, a cover having on a free edge a flap folded inside the cover when the publication is mailed and adapted to be folded outward over the front of the cover, the face of the flap exposed by the outward folding bearing printed legends indicating the proposed routing of the publication to a group of associated individuals and bearing suitably designated spaces respectively opposite the said legends for notations by or for the corresponding individuals to indicate the part of the publication in which the holders of such titles are most interested in, the flap being of such a size and shape as not materially to conceal the cover when thus outwardly folded.

5. In a publication, a flap normally folded within the publication and adapted to be folded outward over a portion of the front of the cover and bearing legends exposed when the flap is thus folded outwardly, the said legends designating the titles of various employees of an establishment to whom the publication is successively to be routed, the flap being scored at its juncture with a contiguous part of the publication to facilitate the manual detaching thereof and the flap bearing on its reverse side instructions as to its disposal when detached.

6. Means for routing a single copy of a publication through an organization or institution so as to insure its reaching the various officials or employees thereof in a predetermined order, comprising a publication part bearing printed legends designating the titles of various officials or other employees of a typical establishment, separated spaces respectively opposite the said titles for receiving check marks from the holders of the respective titles, and a heading directing the forwarding of the publication from one to another of the holders of the said titles.

7. In a publication, a flap carried by the publication and bearing legends, the said legends designating the titles of various employees of an establishment to whom the publication is successively to be routed, the flap being scored at its juncture with a contiguous part of the publication to facilitate the manual detaching thereof and the flap bearing on its reverse side instructions as to its disposal when detached.

Signed at Chicago, Illinois, June 29th, 1920.

GLENN H. EDDY.